(12) United States Patent
Yu et al.

(10) Patent No.: US 8,887,361 B2
(45) Date of Patent: Nov. 18, 2014

(54) VERTICAL TURNING-MILLING COMPLEX MACHINING CENTER

(75) Inventors: Dehai Yu, Dalian (CN); Chungang Cai, Dalian (CN); Zhihui Ren, Dalian (CN); Wenfeng Zhang, Dalian (CN); Hu Chen, Beijing (CN); Junmin Zheng, Dalian (CN); Qiang Guo, Dalian (CN); Tao Zou, Dalian (CN); Jingming Li, Dalian (CN); Peng Qu, Dalian (CN); Yang Lin, Dalian (CN)

(73) Assignee: Dalian Kede Numerical Control Co., Ltd, Dalian (CN)

( * ) Notice: Subject to any disclaimer, the term of this patent is extended or adjusted under 35 U.S.C. 154(b) by 397 days.

(21) Appl. No.: 13/504,960

(22) PCT Filed: Oct. 29, 2010

(86) PCT No.: PCT/CN2010/078268
§ 371 (c)(1),
(2), (4) Date: Apr. 29, 2012

(87) PCT Pub. No.: WO2011/050750
PCT Pub. Date: May 5, 2011

(65) Prior Publication Data
US 2012/0210551 A1   Aug. 23, 2012

(30) Foreign Application Priority Data

Oct. 29, 2009  (CN) .......................... 2009 1 0208493
Oct. 29, 2009  (CN) ...................... 2009 2 0268169 U

(51) Int. Cl.
*B23P 23/02*   (2006.01)
*B23C 1/12*    (2006.01)
(Continued)

(52) U.S. Cl.
CPC ................ *B23Q 1/4804* (2013.01); *B23Q 5/40* (2013.01); *B23Q 1/012* (2013.01);
(Continued)

(58) Field of Classification Search
CPC ............. B23P 23/02; B23B 3/10; B23B 3/22; B23B 3/162; B23B 3/165; B23B 3/168
USPC ......... 409/144, 165, 166, 167, 201, 202, 211, 409/212, 216, 230, 235; 29/27 C, 27 R; 483/18; 82/122
See application file for complete search history.

(56) References Cited

U.S. PATENT DOCUMENTS 6,840,896 B2 *   1/2005  Endo et al. ...................... 483/30
(Continued)

FOREIGN PATENT DOCUMENTS

CN             2806043 Y       8/2006
(Continued)

*Primary Examiner* — Erica E Cadugan
*Assistant Examiner* — Michael Vitale
(74) *Attorney, Agent, or Firm* — Novick, Kim & Lee, PLLC; Allen Xue

(57) ABSTRACT

A vertical turning-milling complex machining center comprises a horizontally-arranged bed body (6) and a vertically-arranged column (7). The bed body (6) is provided with an X-axis lateral supporting linear track (2) and an X-axis guide screw (5). The bed body (6) is also provided with a uniaxial rotating table (1) which can reciprocate and is driven directly by a first external rotor torque motor. The column (7) is vertically provided with a Z-axis lateral supporting linear track (10), a Z-axis guide screw (9) and a crossbeam (11) that reciprocates up and down. The crossbeam (11) is provided with a transverse Y-axis linear track (13), a Y-axis guide screw (12) and a single-pendulum milling head seat frame that can reciprocate along the Y-axis guide screw (12). The single-pendulum milling head is driven directly by a second external rotor torque motor. The vertical turning-milling complex machining center uses direct-drive technology applied to a B-axis and a C-axis, the motor torque is greatly increased and functional parts can stably operate, therefore the integral rigidity and stability of the machining center are improved.

9 Claims, 10 Drawing Sheets

(51) Int. Cl.
  *B23C 1/14*   (2006.01)
  *B23Q 1/48*   (2006.01)
  *B23Q 5/40*   (2006.01)
  *B23Q 1/01*   (2006.01)
  *B23Q 5/10*   (2006.01)
  *B23B 3/22*   (2006.01)
  *B23C 9/00*   (2006.01)
  *B23B 11/00*  (2006.01)

(52) U.S. Cl.
  CPC ... *B23Q 5/10* (2013.01); *B23C 1/12* (2013.01); *B23B 3/22* (2013.01); *B23C 9/005* (2013.01); *B23B 11/00* (2013.01); *B23P 23/02* (2013.01); *B23Q 1/4819* (2013.01); *B23Q 1/4842* (2013.01)
  USPC ............ 29/27 R; 29/27 C; 409/144; 409/165; 409/167; 409/201; 409/202; 409/230; 82/122

(56) References Cited

U.S. PATENT DOCUMENTS

| | | | |
|---|---|---|---|
| 7,201,546 B2 * | 4/2007 | Ichino et al. | 409/165 |
| 7,500,297 B2 * | 3/2009 | Okada et al. | 29/27 C |
| 7,563,062 B1 * | 7/2009 | Chen | 409/230 |
| 2009/0123246 A1 * | 5/2009 | Matsui | 409/201 |
| 2010/0104389 A1 * | 4/2010 | Nakada | 409/167 |

FOREIGN PATENT DOCUMENTS

| | | | |
|---|---|---|---|
| CN | 101007388 A | | 8/2007 |
| CN | 101011793 A | * | 8/2007 |
| CN | 200995332 Y | | 12/2007 |
| CN | 101234474 A | | 8/2008 |
| CN | 101722419 A | | 6/2010 |
| EP | 1452270 A1 | | 9/2004 |
| JP | 2007000966 A | * | 1/2007 |

* cited by examiner

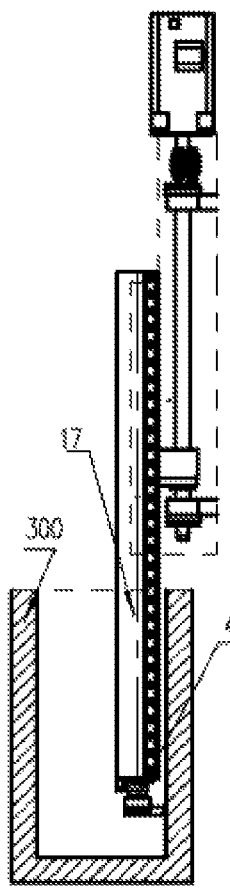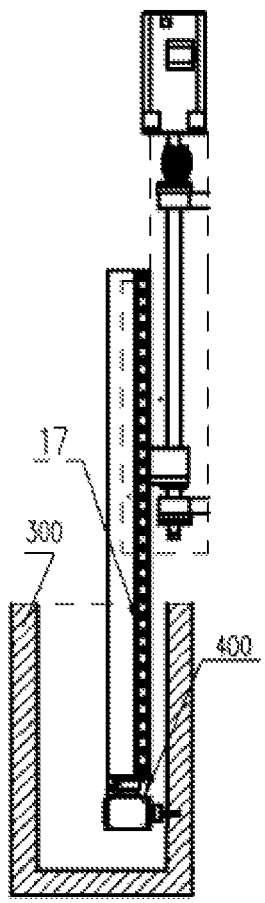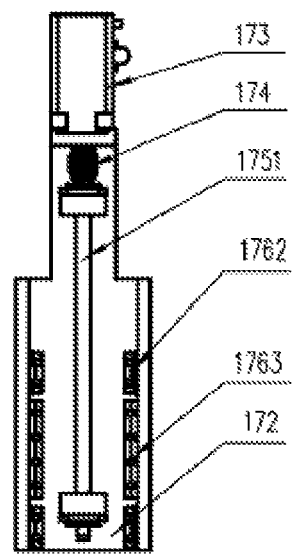
FIG.9-1    FIG.9-2    FIG.10

VERTICAL TURNING-MILLING COMPLEX MACHINING CENTER

TECHNICAL FIELD

The present invention relates to machine tools, more particularly to a vertical turning and milling complex machining tool.

BACKGROUND

With the fast development of automobile, national defense, aviation, aerospace and other industries as well as the application of new materials like aluminum alloy, there are increasingly high requirements on combined machine tools. As taking typical parts in aviation industry, such as a turbine case and a fan case, for example, turning, milling, radial drilling and boring and other machining operations are required simultaneously in the process for such parts, and high precision is needed. Therefore, a workpiece needs to be positioned, clamped and set with respect to cutters repeatedly among a plurality of machine tools during actual machining, which would cause time waste and reduce production efficiency, and plenty of unnecessary errors are generated midway due to the continuous replacement and adjustment of cutters. The production efficiency and the machining precision must be improved remarkably if these functions are integrated.

Meanwhile, in mechanical transmission technologies of the prior art, a motor rotates to generate power, and the power is enlarged by mechanical transmission elements, such as a transmission case, a reduction gearbox, a guide screw and a worm gear, and then is transmitted to an executing part, whereby the machine operates. While functions that a lot of traditional machine tools fail to achieve have been achieved by applying these mechanical transmission technologies to key parts of a machine tool, such as a C-axis rotating machine tool work table and a B-axis pendulum machine tool milling head and the like, these technologies functioning simply by mechanical transmission could not keep pace with the development of modern international machine tool manufacturing industry in the aspects of speed, precision and service life.

In addition, a majority of the complex multi-axis machine tools at home and abroad adopt a single driving center driving, i.e. one ball screw, for driving key functional parts, such as a uniaxial rotating work table, but in this kind of structure, a driving force cannot act upon the gravity center of a moving member accurately during the machining course. Therefore, there is a tendency to generate a twisting motion under high cutting speed, especially under large feeding speed and high rotating speed of a rotating table. This unavoidable twisting motion and the effect of inertia generated by the moving member is to lead to the vibration of the machine tool, which causes machine tool members, such as castings including a machine tool bed body or stand columns and the like, to be bent or deformed, and affects the precision and service life of the rotating table to a certain extent.

On the other hand, it has been found in accordance with the investigation on the current common vertical complex machining centers on the market that a pendulum head used in a traditional vertical complex turning and milling cannot enter the deep inside of a part for machining owing to limitations in the structure and dimension thereof, and a traditional vertical lathe is incapable of performing milling work. The machining requirements of the parts like a turbine case could be satisfied if these two functions are integrated.

Furthermore, with the development of manufacturing industry and increasingly fierce competitions, the machining requirement of parts becomes more complex. With respect to the machining of some large cavity-type parts turning, milling and drilling are required at the same time. During actual machining, a workpiece needs to be moved among vertical lathe, milling machine and drilling machine and be set with respect to the cutters, which results in low utilization rate of the machine tools, greatly increases the machining-assisting time and the errors due thereto owing to complex operations, and affects the machining efficiency and precision negatively. All the present power heads or angle heads on the market depend on machining power transmission via a machine tool spindle, and accordingly, cannot be applied to a vertical lathe like structure that is not provided with a cutter rotating machining function. However, the contradiction lies in the fact that this vertical lathe like structure most urgently requires milling and drilling machining.

SUMMARY OF THE INVENTION

In view of the above problems in the prior art, the present invention aims at providing a vertical turning and milling complex machining center, which can achieve machining requirements, such as turning, milling, drilling, grinding and boring, with respect to a circular cavity-type part like a turbine case on the basis of single clamping by means of machining programming, and even can enter the deep inside of a relatively large part to carry out copy milling.

The technical solution of the present invention is implemented as follows:

a vertical turning and milling complex machining center comprising:
  a bed body, which is horizontally disposed;
  two stand columns, which are respectively fixed at left and right sides at one end of the bed body and vertical to the bed body;
  the vertical turning and milling complex machining center is characterized by further including:
  two X-axis side portion supporting line rails and two X-axis guide screws, which are respectively disposed at left and right sides of the bed body in an X-axis direction corresponding to the two stand columns; X-axis drive motors are respectively disposed at end portions of the X-axis guide screws;
  a uniaxial rotating table, which is located between the two X-axis side portion supporting line rails and is driven directly by a first external rotor torque motor at a lower portion thereof; a transverse saddle of the uniaxial rotating table fitly connecting with the two X-axis guide screws in a manner of reciprocating movement along the X-axis;
  two first Z-axis side portion supporting line rails and two first Z-axis guide screws, which are respectively disposed on the stand columns in a Z-axis direction; a crossbeam being erected between the two first Z-axis side portion supporting line rails and fitly connecting with the two first Z-axis guide screws in a manner of vertically reciprocating movement along the Z-axis; first Z-axis drive motors are respectively disposed at end portions of the Z-axis guide screws;
  two Y-axis line rails and a Y-axis guide screw, which are vertically disposed on the crossbeam in an Y-axis direction respectively; a transverse sliding table, which fitly connects with the Y-axis guide screw in a manner of reciprocating movement along the Y-axis, is disposed on the crossbeam; a Y-axis drive motor is disposed at an end portion of the Y-axis guide screw;

the transverse sliding table is provided with a single pendulum milling head component which is driven directly by a second external rotor torque motor at the rear portion thereof.

Further, a middle part at a lower portion of the uniaxial rotating table is located on an X-axis middle portion supporting line rail; and the gravity center of the uniaxial rotating table is located in a plane where the X-axis guide screws at both sides are positioned, and is located at a middle part between the two X-axis guide screws.

Further, the vertical turning and milling complex machining center further comprises a vertical tool post component;

the vertical tool post component includes an elongated vertical tool post, a tool post base, and a second Z-axis supporting line rail and a second Z-axis guide screw pair disposed at both sides of opposite surfaces between the vertical tool post and the tool post base, wherein the second Z-axis guide screw pair is connected with a second Z-axis drive motor via a shaft coupling;

the tool post base is fixed at a single pendulum milling head side of the transverse sliding table and reciprocates along with the transverse sliding table in the Y-axis direction;

the vertical tool post is supported by the second Z-axis supporting line rail and reciprocates in the Z-axis direction under the driving of the second Z-axis guide screw pair;

a tool clamping mechanism is disposed at a lower portion of the vertical tool post.

Further, the Z-axis line rail on the vertical tool post component further includes damping slide blocks which are assigned on a guide rail so as to be fixed by bolts on the tool post base.

Furthermore, a tool holder directly driven by a torque motor is connected with the tool clamping mechanism via a tool handle;

the tool holder is provided with an inner cavity in which a core shaft and the torque motor are disposed;

the core shaft is supported and positioned through a bearing set disposed in the inner cavity of the tool holder; bearings are positioned and compressed by a core shaft shoulder and locking nuts; tapered holes for clamping the tool are formed at a front end of the core shaft. The tool is tightly clamped by the tapered holes in cooperation with a ferrule and the locking nuts at the front end;

the motor is located at the middle part of the whole core shaft, a motor rotor is adhered to the core shaft, and a motor stator is fixed on a wall of the inner cavity of the tool holder;

a self-sealing type electrical interface is installed on the tool holder and is in butt joint with an electrical interface on the tool clamping mechanism which is assortedly installed on the vertical tool post component;

the electrical interface includes a power supply interface and a servo drive interface;

a rotary encoder is installed on a tail end of the core shaft, and the electrical interface further correspondingly includes an encoder interface.

Further, the second Z-axis supporting line rail on the vertical tool post component further includes damping slide blocks, and the damping slide blocks are assigned on the guide rail so as to be fixed by bolts on the tool post base.

Compared with the prior art, the present invention has the following prominent technical effects:

First of all, as a five-axis vertical complex machining tool, the present invention uses direct-drive technology for B axis (i.e. rotating about the Y axis) and C axis (i.e. rotating about the Z axis), and all functional components on the machine tool are directly driven by external rotor torque motors, therefore, the motor torque is greatly increased and the functional components can stably operate, so as that the integral rigidity and stability of the machine tool are improved dramatically, and plenty of problems that could not be solved by traditional mechanical transmission are solved.

In terms of efficiency, in contrast to the machine tools in the prior art that adopt traditional mechanical transmission functional components to realize an indexing speed in a range from over 10 revolutions per minute to dozens of revolutions per minute, the present invention can reach hundreds of revolutions per minute in a rotating speed of the rotating table and a swing speed of the pendulum head after the direct-drive technology is applied to the functional components; It means that the machine tool in the present invention can improve the production efficiency by 10 times compared with similar machine tools in the same industry;

In terms of precision, the equipment in the present invention that uses the direct-drive technology can easily realize the sensitivity as high as one-in-thousands millimeter or an arc second-grade sensitivity at the functional components; however, most of the similar machine tools in the prior art that adopt previous mechanical transmission can only realize the sensitivity as high as one-in-hundreds millimeter or an arc minute-grade sensitivity;

In terms of service life, this equipment that uses the direct-drive technology reduces the number of parts for mechanical transmission, reduces abrasion, prolongs service life, saves energy and raw materials and manufacturing cost greatly, and accordingly, lowers the integral cost of the equipment.

Two key functional components in the present invention including the uniaxial rotating table and the single pendulum milling head component are both driven with the external rotor direct-drive technology, an external-rotor-structured torque motor has higher torque, higher mechanical advantages and can realize more steady rotation than an internal-rotor-structured torque motor with the same volume. In addition, the external rotor that adopts a hydraulic brake mechanism is simple in structure with a wide clamping action area, which makes the external motor have larger brake force and steady clamping with little influence on the system and the transmission. Meanwhile, in contrast to other motors with the same torque, the external rotor torque motor may be smaller in volume, and in the machine tool industry, a small volume in the case of equivalent performances results in explicit advantages.

In the present invention, the uniaxial rotating table is disposed between two ball screws, an ideal but virtual gravity center is formed when the rotating table is no-load, while an effect that is completely identical to the passage of an actual drive force through a gravity center could be generated, which perfectly inhibits the vibration and bending generated as being driven by the X axis, no change of the gravity center occurs even if the uniaxial rotating table moves at high speed in the X-axis direction, so as that stable driving is implemented. Moreover, the equipment in the present invention may also adopt three line rails, namely, besides the line rails installed at the both sides of the uniaxial rotating table, a line rail is further installed at the center of the bottom portion of the uniaxial rotating table to play the role of supporting, in this way, deformation could be minimized even if the rotating table is under load;

The tool holder in the present invention, which is directly driven by the torque motor, is connected to the tool clamping mechanism of the machine tool via the tool handle, and is power inputted by the butt joint of the self-sealing type electrical interface installed on the tool holder with the electrical interface assortedly installed on the tool clamping mechanism of the machine tool so as to be directly driven by the torque motor to machine a workpiece, that is to say, when power is switched on, the motor installed inside the inner cavity of the tool holder drives the core shaft of the tool to rotate directly, and the tapered holes at the front end of the core shaft for connecting with the tool as well as the locking nuts can clamp a variety of required tools conveniently.

Therefore, the equipment has extra milling and drilling ability and can carry out axial or radial machining so as to meet the machining demands in different cases. Moreover, cutting scraps and water and air pollution during machining can be avoided effectually by adopting the self-sealing type electrical interface.

The damping slide blocks are used for reducing the vibration on the guide rail system, i.e. on the second Z-axis supporting line rail, improving the machining quality, prolonging the service life of the tool under vibrating condition, and protecting the line rail system in the case of overload.

The present invention can effectively reduce the auxiliary time for assembling/removing and exchanging the workpiece and adjusting the tool as well as the errors generated during the intermediate process, improve the machining precision of the parts, shorten the manufacturing cycle of the products, enhance the production efficiency and the market response ability of the manufacturers, and avoid, compared with traditional production methods having decentralized procedures, repeated clamping as well as precision loss and time waste caused thereby, hence, the machining efficiency is raised and the machining precision is guaranteed to the maximal extent.

To put it simply, the vertical complex machining center disclosed in the present invention reduces the vibration remarkably, brings the integral performances of the machine tool into full play, enhances the machining precision of the rotating table and other functional components effectively, increases the acceleration of the linear feed movement of the rotating table drive shaft in the vertical complex machining center, and simultaneously, and prolongs the service life of the tool in the premise of not lowering the surface roughness and the form/position accuracy. In particularly, owing to the vertical complex machining center, the machine tool manufacturing and machining process is simplified and the production cost is lowered.

BRIEF DESCRIPTION OF THE DRAWINGS

FIG. 9-1 is a schematic diagram of using the vertical tool post for turning a part with a deeper internal bore in Embodiment 2;
FIG. 9-2 is a schematic diagram of using the vertical tool post for milling and drilling a part with a deeper internal bore in Embodiment 2;
FIG. 10 is a structural schematic diagram of the tool post base and relevant accessories thereon in Embodiment 2;
FIG. 14-1 is a diagram showing the operating state of the radial machining structure of the tool holder driven directly by the torque motor;
FIG. 14-2 is a diagram showing the operating state of the axial machining structure of the tool holder driven directly by the torque motor.

Figure 1:
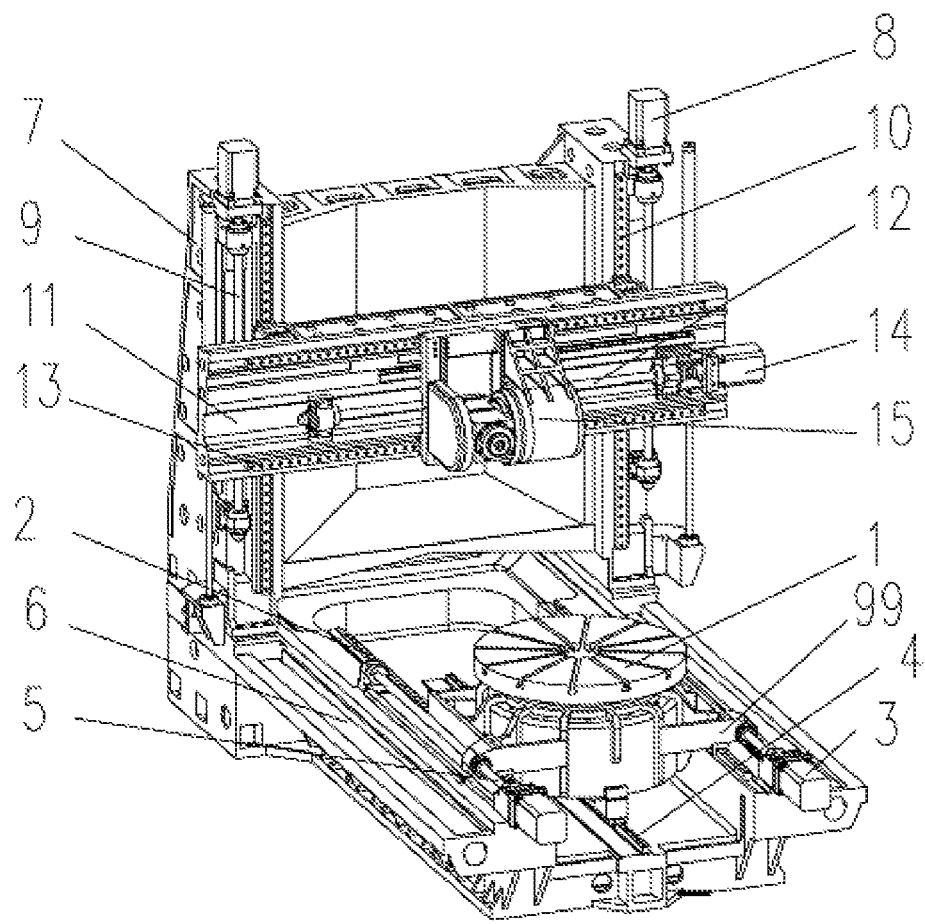
FIG. 1 is a structural schematic diagram of Embodiment 1.

In the drawings,
1. uniaxial rotating table 2. X-axis side portion supporting line rail 3. X-axis drive motor 4. X-axis middle portion supporting line rail 5. X-axis guide screw 6. bed body 7. stand column 8. Y-axis drive motor 9. Z-axis guide screw 10. first Z-axis side portion supporting line rail 11. crossbeam 12. Y-axis guide screw 13. Y-axis line rail 14. Y-axis drive motor 15. single pendulum milling head component 16. transverse sliding table 17. vertical tool post component 99. transverse saddle
101. bracket of encoder a 102. spindle box 103. encoder a 104. turning and milling spindle 105. bearing gland 106. rotating table bearing 107. bearing seat 108. second direct-drive type external rotor torque motor casing 109. clamping device 110. second direct-drive type external rotor torque motor rotor 111. second direct-drive type external rotor torque motor stator 112. second direct-drive type external rotor torque motor bottom plate 113. water jacket
171. vertical tool post 172. tool post base 173. second Z-axis drive motor 174. shaft coupling 1751/1752. second Z-axis guide screw pair (screw shaft/screw) 176. second Z-axis supporting line rail 1761. guide rail 1762. guide rail slide block 1763. damping slide block 177. tool clamping mechanism 1771. shift sensor 1772. oil cylinder 1773. disc-shaped spring 1774. fluid conveyance connector 1775. pulling claw 1776. external electrical interface
201. support plate 202. first direct-drive type external rotor torque motor bottom plate 203. motor cooling device 204. first direct-drive type external rotor torque motor 205. first direct-drive type external rotor torque motor casing 206. internal jacket 207. rotary bearing 208. first direct-drive type external rotor torque motor rotor 209. tightening device 210. encoder c 211. connecting disc 212. work table main body
300. workpiece to be machined
400. tool holder driven directly by torque motor 401. rear end locking nut 402. rear end bearing set 403. tool holder internal motor 4031. tool holder internal motor rotor 4032. tool holder internal motor stator 404. front end bearing set 405. core shaft 406. front end locking nut 407. ferrule 408. front end cover 409. tool handle 410.

self-sealing electrical interface 411. bearing bushing 412. rear end cover 413. rotary encoder 400'. common tool holder

DETAILED DESCRIPTION OF THE EMBODIMENTS

Embodiment 1

A vertical turning and milling complex machining center, as shown in FIG. 1, comprises: a bed body 6 which is horizontally disposed, two stand columns 7 fixed at left and right sides at one end of the bed body respectively and vertical to the bed body; two X-axis side portion supporting line rails 2 and two X-axis guide screws 5 respectively disposed at left and right sides of the bed body 6 corresponding to the two stand columns; a uniaxial rotating table 1 is located on the two X-axis side portion supporting line rails 2, and a transverse saddle of the uniaxial rotating table 1 fitly connects with the two X-axis guide screws 5 in a manner of reciprocating movement along the X axis; X-axis drive motors 3 are respectively disposed at the end portions of the X-axis guide screws; the uniaxial rotating table 1 is driven directly by a first external rotor torque motor 204 at the lower portion thereof;

First Z-axis side portion supporting line rails 10 and first Z-axis guide screws 9 are respectively disposed on the two stand columns 7 in an Z axis direction, a crossbeam 11 is erected between the two first Z-axis side portion supporting line rails 10 and fitly connects with the two first Z-axis guide screws 9 in a manner of vertically reciprocating movement along the Z axis; first Z-axis drive motors 8 are respectively disposed at the end portions of the Z-axis guide screws 9;

Two Y-axis line rails 13 and a Y-axis guide screw 12 are vertically disposed on the crossbeam 11 in an Y-axis direction respectively, and an Y-axis drive motor 14 is disposed at the end portion of the Y-axis guide screw 12; a transverse sliding table, which fitly connects with the Y-axis guide screw 12 in a manner of reciprocating movement along the Y-axis, is disposed on the crossbeam 11; the transverse sliding table is provided with a single pendulum milling head component 15 which is driven directly by a second external rotor torque motor at the rear portion thereof so as to swing in a B axis of the machine tool, namely to swing about the Y axis.

Figure 2:
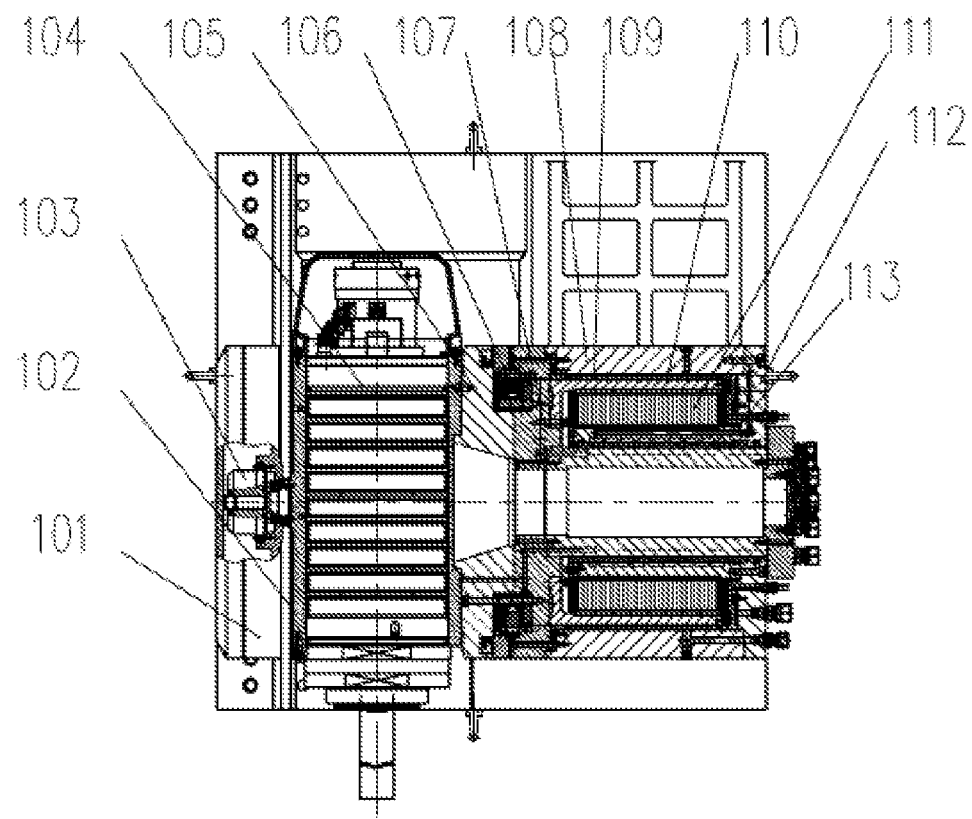
FIG. 2 is a structural schematic diagram of the direct-drive type external rotor torque motor.

The second external rotor torque motor, as shown in FIG. 2, drives the single pendulum milling head component 15 directly, and includes a torque motor stator 111, a rotor 110, a clamping device 109 for realizing brake, a motor cooling device for cooling, and other auxiliary structures used in the pendulum head, such as an encoder a 103, a bracket of the encoder a 101, a spindle box 102, a turning and milling spindle 104, a bearing gland 105, a rotating table bearing 106, a bearing seat 107, a casing 108, a bottom plate 112, a water jacket 113, and the like.

Figure 3:
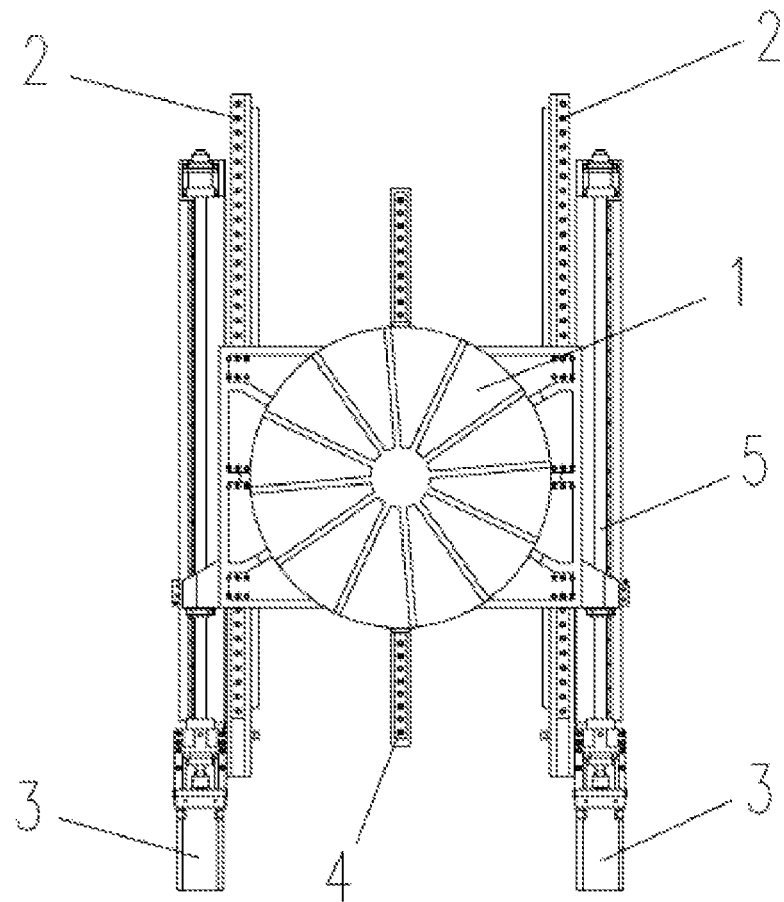
FIG. 3 is a top view of the disposing manner of the uniaxial rotating table in Embodiment 1.
Figure 4:
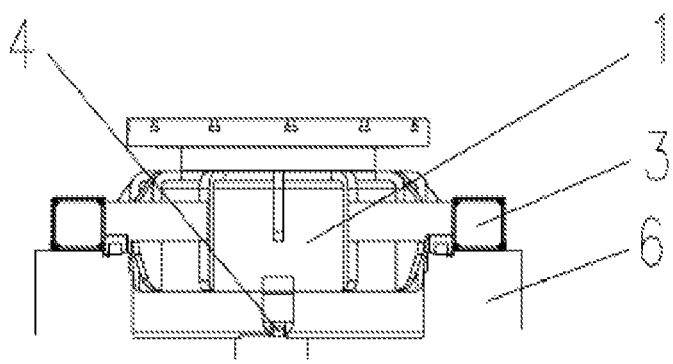
FIG. 4 is a bottom view of the uniaxial rotating table in FIG. 3.

The uniaxial rotating table is disposed in such a manner as shown in FIG. 3 and FIG. 4 that the both sides at the lower portion of the uniaxial rotating table 1 are symmetrically located on the X-axis side portion supporting line rails 2, and the middle part at the lower portion of the uniaxial rotating table 1 is located on an X-axis middle portion supporting line rail 4, wherein the supporting line rail mainly plays the role of supporting. The X-axis guide screws 5, in parallel to the X-axis side portion supporting line rails 2 and the X-axis middle portion supporting line rail 4, are symmetrically disposed above the X-axis side portion supporting line rails 2; the uniaxial rotating table 1 fitly connect with the X-axis guide screws 5 via a transverse saddle 99, and the transverse saddle 99 reciprocates on the X-axis guide screws 5 along the X axis when the motors 3 drive the guide screws 5 to rotate; the gravity center of the uniaxial rotating table 1 is transversely located at the center part of the transverse saddle 99, and is longitudinally supported mainly by the X-axis middle portion supporting line rail 4.

Figure 5:
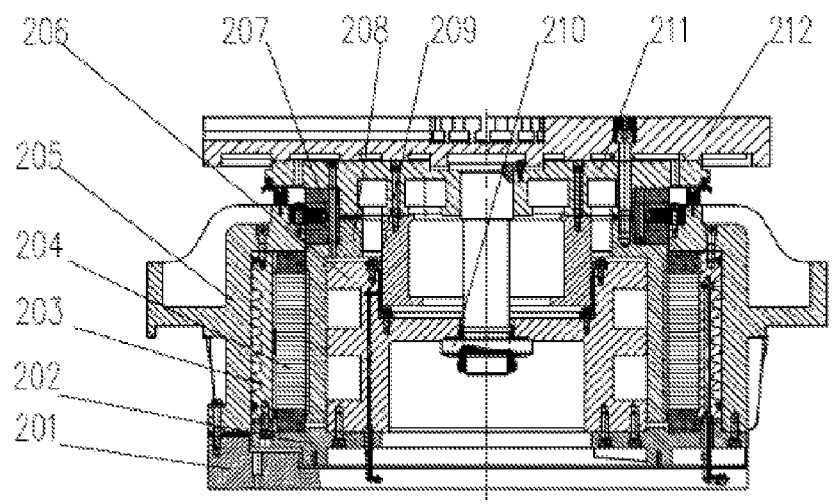
FIG. 5 is a structural schematic diagram of the uniaxial rotating table in Embodiment 1.

The structure of the uniaxial rotating table as shown in FIG. 5 includes a work table main body 212, a first direct-drive type external rotor torque motor 204, a rotor 208, a tightening device 209 for braking, a motor cooling device 203 for cooling, and other auxiliary components, such as a support plate 201, a bottom plate 202, a casing 205, an internal jacket 206, a rotary bearing 207, an encoder c 210, and a connecting disc 211.

Figure 6:
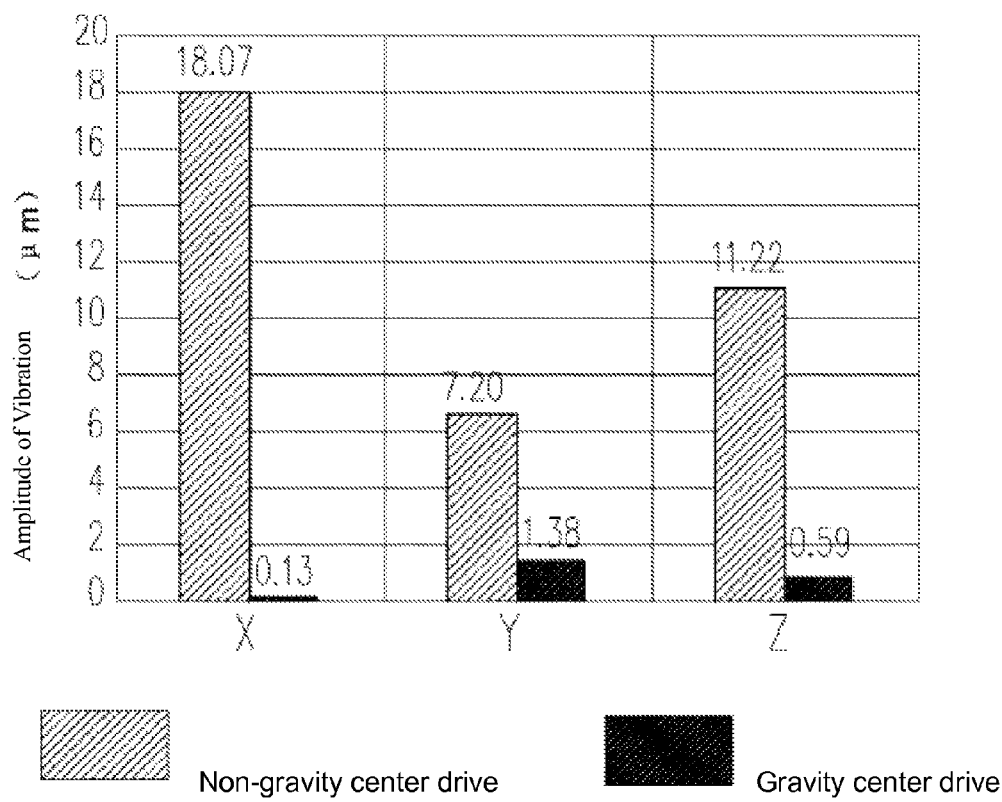
FIG. 6 is a comparison diagram of the vibration amplitude between the uniaxial rotating table in Embodiment 1 and a non-gravity center-driven rotating table.

Compared with the non-gravity center driven rotating table as shown in FIG. 6, the vibration amplitude of the uniaxial rotating table that adopts the gravity center drive manner has been obviously reduced.

The five-axis vertical complex machining center in the present embodiment applies direct-drive technology to its two key functional components, that is, the equipment is directly driven by motors to operate, without midway transmission procedures. In the five-axis vertical complex machining center, a direct-drive type single pendulum milling head is applied in the B axis, as shown in FIG. 2; a direct-drive type uniaxial rotating table is applied in the C axis, as shown in FIG. 5; the common feature of the both is that the torque motor is used as core driving element for rotating movement so as to realize the double-direct-drive type five-axis milling and turning function. And the so-called external rotor structure means that the outer ring is a permanent magnet rotor while the inner ring is a stator composed of silicon steel sheet and coil winding, and a brake mechanism acts upon the external rotor body. In a case of taking the uniaxial rotating table as an example, a table surface is directly fixed at the end portion of an AC permanent magnet synchronous external rotor type torque motor rotor, and a fixing casing of the rotating table is connected with a stator cooling sleeve and a stator of the torque motor, therefore, the uniaxial rotating table driven by the external rotor type torque motor in the present embodiment can omit the midway transmission procedures so as to enhance the operation precision and steadiness of the rotating table; meanwhile, the motors can output larger torques, thus mechanical efficiency is raised; moreover, by adopting a hydraulic braking mechanism, the braking mechanism is simplified, and the clamping area is increased, the braking force is large, which result in steady clamping and little influence on the system and the transmission; the volume of the external rotor torque motor is smaller under the situation of equivalent performances to reduce the volume of the rotating table, so as to make the integral structure of the machine tool more compact.

Embodiment 2

Figure 7:
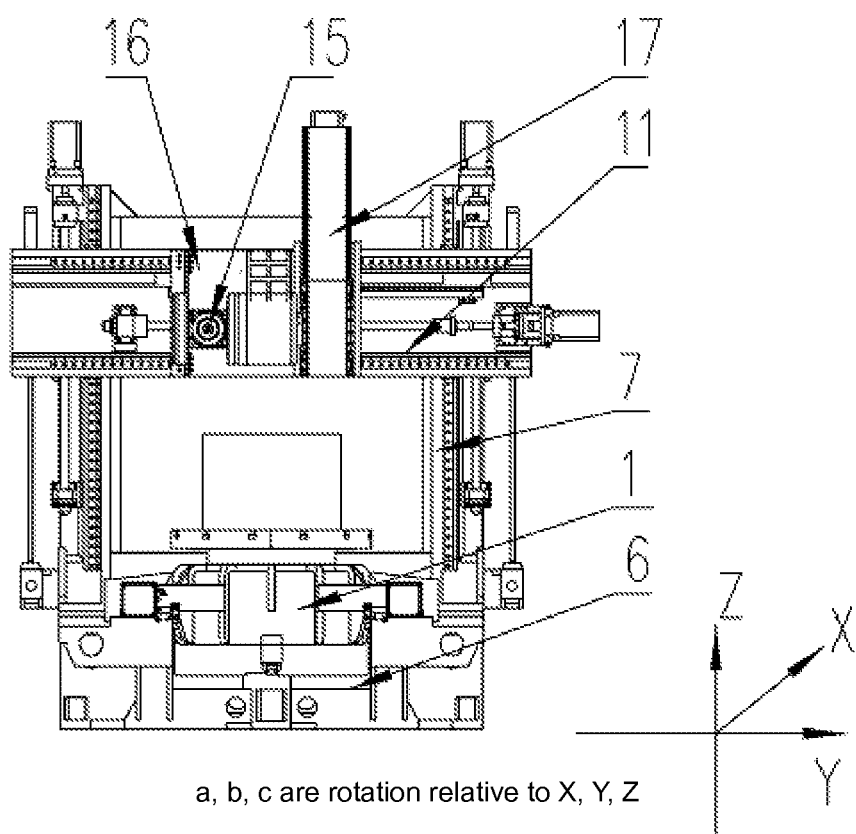
FIG. 7 is a structural schematic diagram of Embodiment 2.
Figure 8:
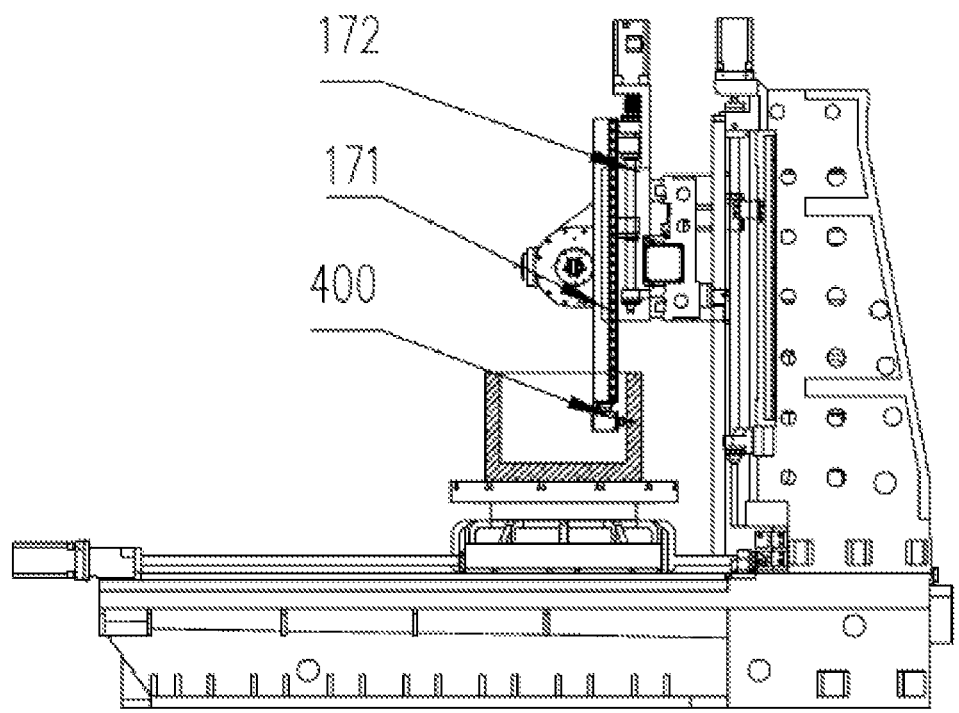
FIG. 8 is a side view of FIG. 7.
Figures 11, 12:
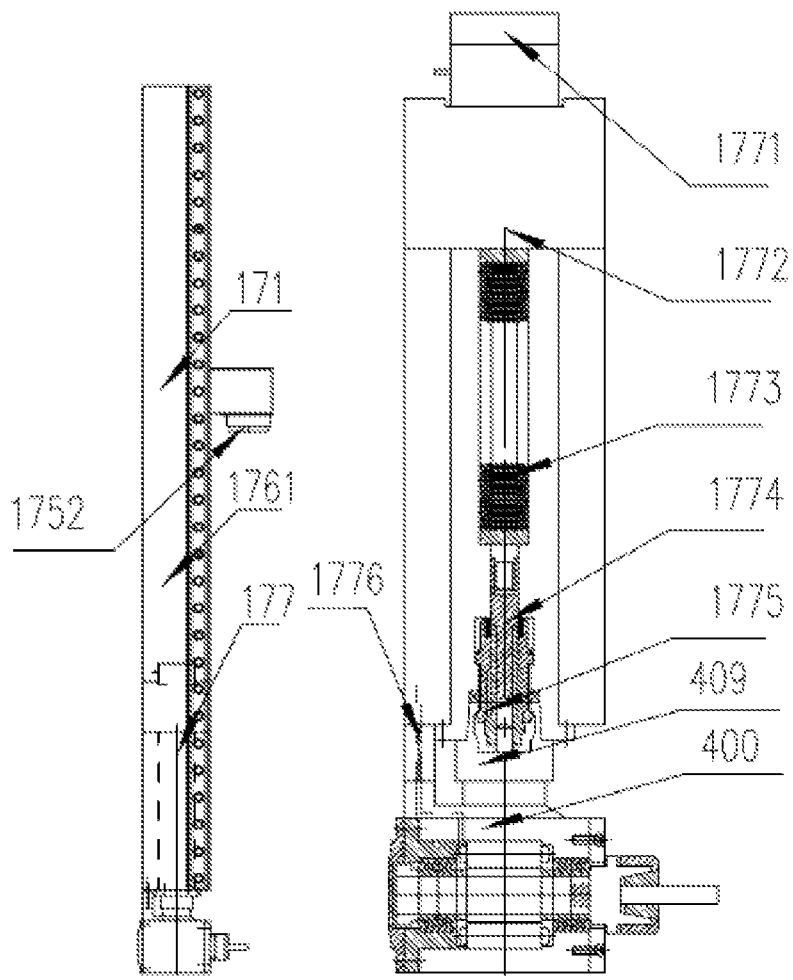
FIG. 11 is a structural schematic diagram of the vertical tool post and relevant accessories thereon in Embodiment 2.
FIG. 12 is a structural schematic diagram of the tool clamping mechanism, and the tool holder driven directly by the torque motor and connected with the tool clamping mechanism via the tool handle.

On the basis of the Embodiment 1, the vertical turning and milling complex machining center, as shown in FIG. 7 and FIG. 8, further includes a vertical tool post component 17;

The vertical tool post component 17 includes an elongated vertical tool post 171, a tool post base 172, two second Z-axis supporting line rails 176 and a second Z-axis guide screw pair (screw shaft/screw) disposed at both sides of opposite surfaces between the vertical tool post and the tool post base, wherein the second Z-axis guide screw 1751 of the second Z-axis guide screw pair is connected with a second Z-axis drive motor 173 via a shaft coupling 174;

The 172, as shown in FIG. 10, is fixed at a single pendulum milling head 15 side of the transverse sliding table 16 and reciprocates along with the transverse sliding table 16 in the Y-axis direction;

The vertical tool post 171, as shown in FIG. 11, is supported by the second Z-axis supporting line rail 176 and reciprocates in the Z-axis direction under the driving of the second Z-axis guide screw pair, specifically, guide rails 1761 of the second Z-axis supporting line rail are fixed at both sides of the vertical tool post 171, and a servo motor drives the vertical tool post 171 to move vertically via a second Z-axis screw shaft 1751 and a screw 1752"";

The second Z-axis supporting line rail 176 further includes damping slide blocks 1763 which are assigned on the guide rail so as to be fixed by bolts on the tool post base 172, as shown in FIG. 19; the damping slide blocks RUDS . . . -D installed here are used for reducing the vibration on the guide rail system, i.e. on the second Z-axis supporting line rail, improving the machining quality, prolonging the service life of the tool under vibrating condition and protecting the line rail system in the case of overload.

A tool clamping mechanism 177 is disposed at the lower portion of the vertical tool post 171, as shown in FIG. 12, and includes a shift sensor 1771, an oil cylinder 1772, a disc-shaped spring 1773, a fluid conveyance connector 1774 and a pulling claw 1775, the specific operation manners thereof are as follows:

When a tool is unclamped, the oil cylinder 1772 is compressed downwards so as that the disc-shaped spring 1773 is compressed downwards to drive the pulling claw 1775 to unclamp a tool handle 409 of the tool;

when the tool is clamped, the oil cylinder 1772 is released and the disc-shaped spring 1773 is lifted upwards to drive the pulling claw 1775 to clamp the tool handle 409.

The entire tool clamping mechanism adopts hydraulic tool unclamping mechanical clamping, which avoids the danger caused by accidental pressure loss of the oil cylinder and accordingly makes the entire mechanism safer and more reliable, as shown in FIG. 9-1 and FIG. 9-2.

Standard model HSK-A63 is used as the tool handle to facilitate automatic tool exchanging, besides, there are a great variety of common tool handles on the market that are applicable to different technological requirements and easy for users to make a choice.

Naturally, the tool handle 409 here can also be customized into various types according to the requirements. The types include, but not limited to, HSK, BT.SK, DIN, CAT, etc.

During actual work, the vertical tool post 171 can be stretched into the deep portion of the inner cavity of a part for machining by means of its elongated structure; so compared with a traditional lengthened rod of the turning tool, the vertical tool post has better rigidity and can obtain higher machining precision during machining, furthermore, it can also clamp a power tool to carry out radial milling, cutting, drilling and boring with respect to the internal bore.

Figure 13:
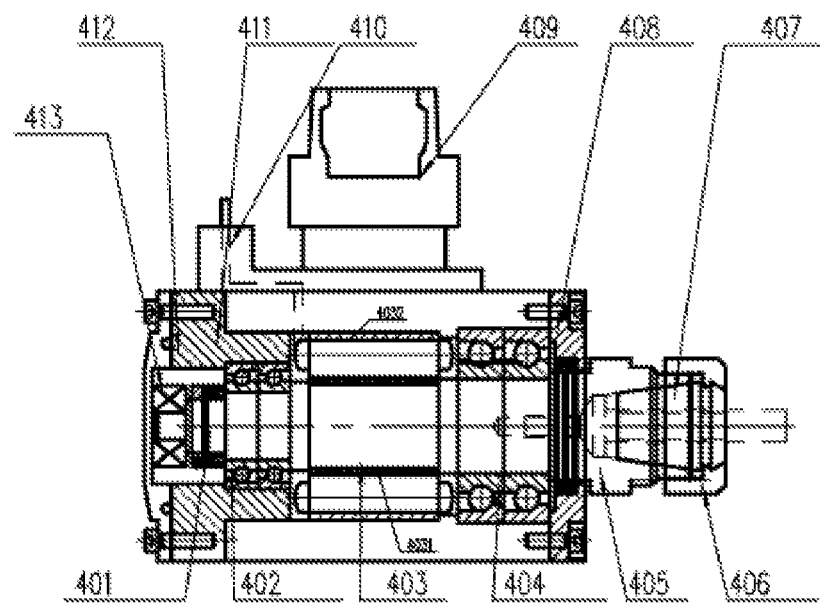
FIG. 13 is a structural schematic diagram of the tool holder driven directly by the torque motor.

The power tool is a tool holder 400 driven directly by a torque motor, as shown in FIG. 13, and the tool holder is provided with an inner cavity in which a core shaft 405 and a motor 403 are disposed;

The motor 403 is located at the middle part of the whole core shaft 405. A motor rotor 4031 is adhered to the core shaft 405, and a motor stator 4032 is embedded in the inner wall of the inner cavity of the tool holder. Standard tapered holes for clamping tools and a front end locking nut 406 are formed at the open front end of the core shaft 405 so as to clamp a variety of tools. A front end cover 408 is internally provided with a skeleton oil seal for preventing oil leakage. Front and rear end bearing sets are installed face to face and are each composed of two angular contact bearing sets for positioning the core shaft 405 and bearing an axial force during machining. The front end bearing set 404 is used for positioning the core shaft 405, therefore, when the front end cover 408 tightly abuts against a bearing outer ring, match grinding is required to ensure accurate and gapless positioning. The rear end bearing set 402 is positioned by means of a shaft shoulder of the core shaft 405 and a rear end locking nut 401, and assists in supporting the core shaft 405. The whole structure becomes more steady in operation since the two bearing sets bear a cutting force simultaneously. A rear end cover 412 is internally provided with a seal ring for preventing oil leakage. A rotary encoder 413 is installed at the closed tail end of the core shaft 405 so as that a user can track and detect the rotating speed condition of the torque motor at any time.

The tool holder 400 driven directly by the torque motor is the same as a common tool holder 400' in the aspect of clamping manner, During clamping, the tool holder 400 is connected with a machine tool clamping mechanism 177 via the tool handle 409, a self-sealing electrical interface 410 on the tool holder 400 is in butt joint with an external electrical interface 1776 on the machine tool clamping mechanism, as shown in FIG. 12; the self-sealing electrical interface 410 on the tool holder includes a power supply interface, a servo drive interface and an encoder interface. By adopting the self-sealing electrical interface, cutting scraps and water and air pollution during machining can be avoided effectually.

The tool holder 100 is moved to be close to the to-be-machined portion of a workpiece 300, power is switched on via a controller, and the core shaft 405 of the tool holder starts rotating under the driving of the motor 403 to carry out machining.

Compared with conventional electric spindle plus angle head, the structure that a tool power device is moved into the inside portion of the tool can reduce the dimension of the tool clamping mechanism more effectively, and can lead to more compact structure and smaller dimension of the vertical tool post. In this case, the minimal internal diameter machining range of the tool post is widened and the adaptability of the tool post is improved.

Figures 1, 2, 14:
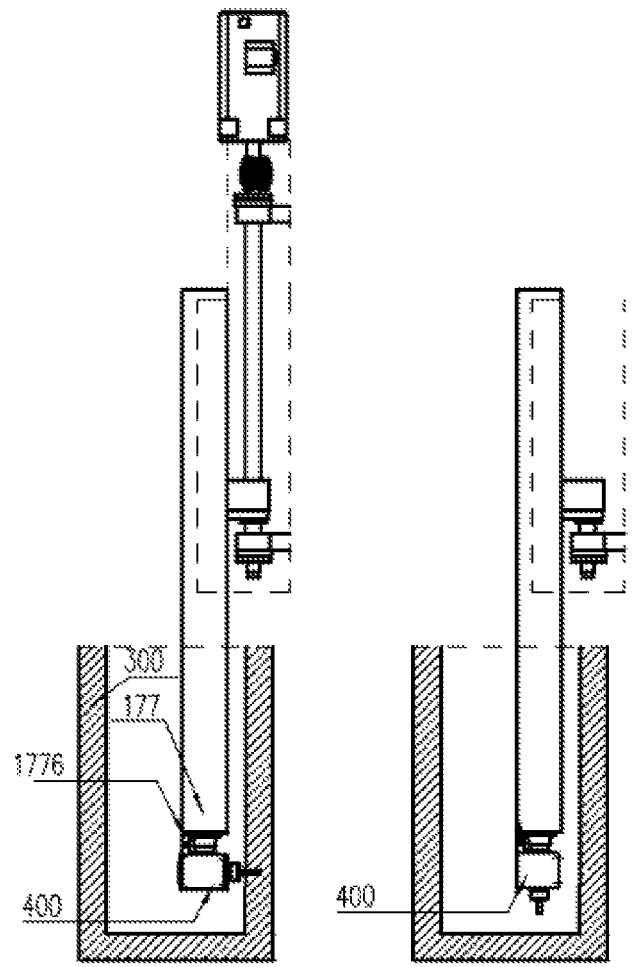

The tool holder can be customized, as required, into a radial machining type as shown in FIG. 14-1, an axial machining type as shown in FIG. 14-2, and even a ±110-degree divided type.

The descriptions above are merely the preferred embodiments of the present invention and do not limit the scope of the present invention, and equivalent alternations or variations made by any skilled that are familiar with this art in accordance with the technical solution of the present invention and its inventive concept within the technical scope disclosed by the present invention should be contemplated as being within the scope of the present invention.

We claim:

1. A vertical turning and milling complex machining center, comprising:
  a bed body;
  two stand columns, which extend with longitudinal axes thereof vertical in a Z-axis direction, and are each affixed to a respective end of the bed body at left and right sides of the bed body;
  two X-axis side portion supporting linear guide rails and two X-axis guide screws, which are respectively disposed at the left and right sides of the bed body and extend with a respective longitudinal axis thereof in an X-axis direction perpendicular to the Z-axis direction, wherein X-axis drive motors are each disposed at a respective end portion of a respective one of the X-axis guide screws;

a rotating table, which is located between the two X-axis side portion supporting linear guide rails and is driven directly by a first external rotor torque motor located below a work table main body of the rotating table;

a transverse saddle that supports the rotating table and is connected to the two X-axis guide screws, the two X-axis guide screws providing for reciprocating movement of the transverse saddle and the rotating table along the X-axis;

the transverse saddle further comprising a middle part that engages an X-axis middle portion supporting linear guide rail, the middle part being located at a midpoint of the rotating table in a Y-axis direction perpendicular to the X and Z-axes, the X-axis middle portion supporting linear guide rail being located on the bed body at a midpoint between the two X-axis side portion supporting linear guide rails in the Y-axis direction;

two first Z-axis side portion supporting linear guide rails and two first Z-axis guide screws, which are each disposed on a respective one of the two stand columns and extend with a respective longitudinal axis thereof in the Z-axis direction, wherein a crossbeam is erected between the two first Z-axis side portion supporting linear guide rails and is connected to the two first Z-axis guide screws for vertically reciprocating movement along the Z-axis; first Z-axis drive motors are each disposed at a respective end portion of a respective one of the Z-axis guide screws;

two Y-axis linear guide rails and a Y-axis guide screw, which extend along the crossbeam with a respective longitudinal axis thereof in the Y-axis direction, wherein a transverse sliding table, which is connected to the Y-axis guide screw for reciprocating movement along the Y-axis, is disposed on the crossbeam; a Y-axis drive motor is disposed at an end portion of the Y-axis guide screw; and the transverse sliding table is provided with a single pivotable pendulum milling head component which is driven directly by a second external rotor torque motor.

2. The vertical turning and milling complex machining center of claim 1, wherein a gravity center of the rotating table is located at a midpoint between the two X-axis guide screws in the Y-axis direction, and in a plane where the two X-axis guide screws are positioned.

3. The vertical turning and milling complex machining center of claim 2, wherein the vertical turning and milling complex machining center further includes a vertical tool post component;

the vertical tool post component includes an elongated vertical tool post, a tool post base, two second Z-axis supporting linear guide rails and a second Z-axis guide screw which are disposed between the vertical tool post and the tool post base, wherein the second Z-axis guide screw is connected with a second Z-axis drive motor via a shaft coupling;

the tool post base is fixed at a single pivotable pendulum milling head component side of the transverse sliding table and reciprocates along with the transverse sliding table in the Y-axis direction;

the vertical tool post is supported by the two second Z-axis supporting linear guide rails and reciprocates in the Z-axis direction under the driving of the second Z-axis guide screw; and a tool clamping mechanism is disposed at an end portion of the vertical tool post.

4. The vertical turning and milling complex machining center of claim 1, wherein the vertical turning and milling complex machining center further includes a vertical tool post component;

the vertical tool post component includes an elongated vertical tool post, a tool post base, two second Z-axis supporting linear guide rails and a second Z-axis guide screw which are disposed between the vertical tool post and the tool post base, wherein the second Z-axis guide screw is connected with a second Z-axis drive motor via a shaft coupling;

the tool post base is fixed at a single pivotable pendulum milling head component side of the transverse sliding table and reciprocates along with the transverse sliding table in the Y-axis direction;

the vertical tool post is supported by the two second Z-axis supporting linear guide rails and reciprocates in the Z-axis direction under the driving of the second Z-axis guide screw; and a tool clamping mechanism is disposed at an end portion of the vertical tool post.

5. The vertical turning and milling complex machining center of claim 4, wherein the two second Z-axis supporting linear guide rails on the vertical tool post component further include damping slide blocks, and the damping slide blocks are fixed by bolts on the tool post base and engage on the two second Z-axis supporting linear guide rails.

6. The vertical turning and milling complex machining center of claim 4, wherein a tool holder directly driven by a torque motor is connected with the tool clamping mechanism via a tool handle;

the tool holder is provided with an inner cavity in which a core shaft and the torque motor are disposed;

the core shaft is supported and positioned through first and second bearing sets disposed in the inner cavity of the tool holder; the first bearing set is positioned and compressed by a core shaft shoulder and a first locking nuts; tapered holes for clamping a tool are formed at an open end portion of the core shaft, wherein the tool is tightly clamped by the tapered holes in cooperation with a ferrule and a second locking nuts;

the torque motor is located within the inner cavity between the first and second bearing sets, a torque motor rotor is adhered to the core shaft, and a torque motor stator is fixed on a wall of the inner cavity of the tool holder;

a self-sealing type electrical interface is installed on the tool holder and forms a butt joint with an electrical interface on the tool clamping mechanism of the vertical tool post component; and the electrical interface includes a power supply interface and a servo drive interface.

7. The vertical turning and milling complex machining center of claim 6, wherein a rotary encoder is installed on a closed end portion of the core shaft; and the electrical interface further includes an encoder interface.

8. The vertical turning and milling complex machining center of claim 6, wherein the two second Z-axis supporting linear guide rails on the vertical tool post component further include damping slide blocks, and the damping slide blocks are fixed by bolts on the tool post base and engage the two second Z-axis supporting linear guide rails.

9. The vertical turning and milling complex machining center of claim 8, wherein a rotary encoder is installed on a closed end portion of the core shaft; and the electrical interface further includes an encoder interface.

* * * * *